United States Patent
Hasegawa et al.

(10) Patent No.: US 6,668,117 B2
(45) Date of Patent: Dec. 23, 2003

(54) ARRAYED WAVEGUIDE GRATING OPTICAL MULTIPLEXER DEMULTIPLEXER

(75) Inventors: Junichi Hasegawa, Tokyo (JP); Atsushi Hi Raizumi, Tokyo (JP); Tsunetoshi Saito, Tokyo (JP); Yoshinobu Nekado, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 105 days.

(21) Appl. No.: 10/094,795

(22) Filed: Mar. 12, 2002

(65) Prior Publication Data

US 2002/0191914 A1 Dec. 19, 2002

(30) Foreign Application Priority Data

Mar. 13, 2001 (JP) .......................... 2001-070635
Jan. 15, 2002 (JP) .......................... 2002-006301

(51) Int. Cl.$^7$ ............................. G02B 6/34; H04B 14/00
(52) U.S. Cl. ............................. 385/37; 385/14; 385/31; 385/129; 385/130; 398/43; 398/48; 398/68; 398/79; 398/87
(58) Field of Search ............................. 385/14, 31, 37, 385/129, 130, 131; 398/43, 48, 68, 79, 84, 87

(56) References Cited

U.S. PATENT DOCUMENTS 6,377,723 B1    4/2002   Saito et al. .................. 385/15
6,456,763 B2 *  9/2002   Kashihara et al. ............. 385/37
6,490,395 B1 * 12/2002   Nara et al. .................... 385/39
6,563,986 B2 *  5/2003   Kashihara et al. ............. 385/37

FOREIGN PATENT DOCUMENTS

JP    11-218639    10/1999    ............ G02B/6/28
JP    2000-292632  10/2000    ............ G02B/6/12

* cited by examiner

Primary Examiner—Brian Healy
Assistant Examiner—Kevin S Wood
(74) Attorney, Agent, or Firm—Oblon, Spivak, McClelland Maier & Neustadt, P.C.

(57) ABSTRACT

An arrayed waveguide grating optical multiplexer/demultiplexer is provided to suppress a temperature depending characteristic of a center wavelength. The arrayed waveguide grating comprises at least one optical input waveguide, a first slab waveguide, an arrayed waveguide, a second slab waveguide, and a plurality of optical output waveguides. The first slab waveguide is separated on an cross separating plane which is intersected to a path of light passing through the first slab waveguide to constitute separated slab waveguides. A slide moving member is provided which may move at least one of these separated slab waveguides along the cross separating plane, depending upon the temperature. A front surface side of the waveguide forming region and a rear surface side of the substrate are sandwiched by a positional shift suppressing member such as a clip. The possition depressing the waveguide forming region by the clip is escaped from the optical axis of the separated slab waveguides.

12 Claims, 11 Drawing Sheets

O: reference
A: 2.5mm
B: -2.5mm
C: -4.0mm

ARRAYED WAVEGUIDE GRATING OPTICAL MULTIPLEXER DEMULTIPLEXER

BACKGROUND OF THE INVENTION

Recently, in optical communications, as a method capable of rapidly increase transmission capacities, many researches and developments of optical wavelength division multiplexing communications have been positively performed and practically used. An optical wavelength division multiplexing communication corresponds to such an optical communication that, for instance, a plurality of lights having different wavelengths from each other are multiplexed and then the multiplexed light is transferred. In such an optical wavelength division multiplexing communication system, in order to demultiplex lights with the different wavelengths each other from the transmitted multiplexed light, an optical transmission device and the like which may transmit, therethrough only such lights having a predetermined wavelengths is necessary.

As one example of such an optical transmission device, a planar lightwave circuit (PLC) as shown in FIG. 15 has been proposed. The planar lightwave circuit indicated in FIG. 15 is called as an arrayed waveguide grating (AWG). This arrayed waveguide grating includes a waveguide forming region 10 made of silica-based glass is formed on a substrate 1 made of, for example, silicon. The waveguide forming region 10 of the arrayed waveguide grating has such a waveguide structure as indicated in FIG. 15.

In other words, the waveguide structure of the arrayed waveguide grating comprises at least one optical input waveguide 2, a first slab waveguide 3, an arrayed waveguide 4, a second slab waveguide 5, and a plurality of optical output waveguides 6. The first slab waveguide 3 is connected to an output side of the at least one optical input waveguide 2. The arrayed waveguide 4 is connected to an output side of the first slab waveguide 3. The second slab waveguide 5 is connected to an output side of the arrayed waveguide 4. The plurality of optical output waveguides 6 are connected to an output side of the second slab waveguide 5, and arranged side by side.

The arrayed waveguide 4 transmits a light which is outputted from the first slab waveguide 3. This arrayed waveguide 4 is formed in such a manner that a plurality of channel waveguides 4a are arranged side by side. The lengths of adjacent channel waveguides 4a are different by a set amount ($\Delta L$) from each other.

The channel waveguides 4a which constitute the arrayed waveguide 4 are normally a large number, for example, 100 pieces. Also, a plurality of optical output waveguides 6 are provided in correspondence with a total number of signal lights having different wavelengths. In the drawings, for the sake of simple illustrations, a plurality of channel waveguides 4a, optical input waveguides 2, and optical output waveguides 6 are represented in a simple abbreviated manner.

For instance, while an optical fiber (not shown) on the transmission side is connected to one of the optical input waveguides 2, multiplexed light may be conducted, to this optical fiber. This multiplexed light is conducted via one of the optical input waveguides 2 to the first slab wavelength 3, and then, is entered into the arrayed waveguide 4, while this multiplexed light is widened due to the diffraction effect thereof, and thereafter, the widened light is transferred via the arrayed waveguide 4.

This multiplexed light which has been transferred via the arrayed waveguide 4 is reached to the second slab waveguide 5, and furthermore, light beams are condensed to each of the optical output waveguides 6, and then, the condensed lights are outputted therefrom. In this case, since the lengths of all of these channel waveguides 4a of this arrayed waveguide 4 are different from each other, phases of the individual light after being transferred via the arrayed waveguide 4 are shifted. Then, a wavefront of condensed light is tilted in response to this shift amount each other, and a position where the lights are condensed may be determined based upon this tilt angle.

It should also be noted that assuming now that an angle (diffraction angle) of light to be condensed is set as "$\phi$" when this light is inputted from the arrayed waveguide 4 to the second slab waveguide 5, formula 1 may be substantially satisfied between this diffractive angle "$\phi$" and a center wavelength (center wavelength of light transmission) $\lambda$ of the light to be condensed:

$$n_s \times d \times \sin\phi + n_c \times \Delta L = m \times \lambda \qquad \text{(formula 1)}$$

where symbol "$n_s$" shows equivalent index of both the first and second slab waveguide; symbol "d" represents an interval between edge portions of the mutual channel waveguides on the side of the first and second slab waveguide; symbol "$\phi$" denotes a diffraction angle; symbol "$n_c$" shows an equivalent index of the arrayed waveguide; symbol "$\Delta L$" shows a difference between lengths of the adjacent channel waveguides; and also, symbol "m" indicates a diffraction order.

In this case, assuming now that a wavelength is set to "$\lambda_0$" at the diffraction angle $\phi=0$, this wavelength "$\lambda_0$" is substantially expressed by the below-mentioned formula (2). Generally speaking, this wavelength "$\lambda_0$" is referred to as a center wavelength of an arrayed waveguide grating.

$$\lambda_0 = n_c \times \Delta L / m \qquad \text{(formula 2)}$$

Also, as shown in FIG. 18, assuming now that a light condensed point of such an arrayed waveguide grating is set to a point "O" at the diffraction angle $\phi=0$, as to a condensed position of such light having another diffraction angle "$\phi_p$", this light is condensed at a position "P" which is different from the above-explained point "O." This position "P" corresponds to such a position which is shifted from the point "O" along an X direction. In this case, assuming now that a distance between these points "O" and "P" along the X direction is set to "x", the below-mentioned formula (3) be substantially satisfied between the distance "x" and the wavelength "$\lambda$".

$$\frac{d\chi}{d\lambda} = \frac{L_f \cdot \Delta L}{n_s \cdot d \cdot \lambda_0} n_g \qquad \text{(formula 3)}.$$

where, symbol "$L_f$" indicates a focal distance of the second slab waveguide 5; and symbol "$n_g$" represents a group index of the arrayed waveguide 4. It should also be noted that the group index "$n_g$" of this arrayed waveguide 4 may be given by the equivalent index "$n_c$" of the arrayed waveguide 4 in accordance with the following formula (4).

$$n_g = n_c - \lambda_0 \frac{dn_c}{d\lambda} \qquad \text{(formula 4)}.$$

The above-explained formula (3) implies such a fact that since the input end of the optical output waveguide 6 is arranged/formed at such a position which is separated from the focal point "O" of the second slab waveguide 5 by a distance "dx" along the X direction, such light having a wavelength different by "dλ" can be derived.

Also, the relationship established in the above-explained formula (3) may be similarly established as to the first slab waveguide 3. That is to say, for example, assuming now that a focal center of the first slab waveguide 3 is set to a point "O" and also, such a point is set to another point "P'" whose location is shifted by a distance "dx'" from this point "O" along the X direction, when light is entered into this point "P'", a wavelength of an output may be shifted by "dλ'." When this relationship is expressed by a formula, the below-mentioned formula (5) may be substantially obtained:

$$\frac{d\chi'}{d\lambda'} = \frac{L'_f \cdot \Delta L}{n_s \cdot d \cdot \lambda_0} n_g \qquad \text{(formula 5)}.$$

where, symbol "$L_f'$" indicates a focal distance of the first slab waveguide 33.

The above-explained formula (5) implies such a fact that since the output end of the optical input waveguide 2 is arranged/formed at such a position which is separated from the focal point "O" of the first slab waveguide 3 by a distance "dx'" along the X direction, such light having a wavelength different by "dλ'" can be derived in the optical output waveguide 6 which is formed at the above-explained focal point "O".

In FIG. 15, a demultiplexing function of an arrayed waveguide grating is schematically illustrated. In the case that a multiplexed light having a plurality of wavelengths λ1, λ2, - - - , λn (symbol "n" is an integer larger than, or equal to 2) is entered into one of optical input waveguides 2, and the demultiplexed lights are outputted from the optical output waveguides 6 which are different from each other every wavelengths.

Also, since the arrayed waveguide grating utilizes the principle idea of the reciprocity characteristic (reversibility) of the optical circuit, this arrayed waveguide grating may own both a function as a multiplexer, and also another function as a demultiplexer. As a consequence, contrary to FIG. 15, in such a case that a plurality of lights having wavelengths different from each other are entered from the respective optical output waveguides 6 into this arrayed waveguide grating, the plurality of lights are traveled through such a transfer path opposite to the above-described transfer path, and then, are multiplexed with each other by way of both the arrayed waveguide 4 and the first slab waveguide 3.Then, the multiplexed light is outputted from one of the optical input waveguides 2.

SUMMARY OF THE INVENTION

According to an aspect of the present invention, an arrayed waveguide grating optical multiplexer/demultiplexer comprises:

a planar lightwave circuit in which a waveguide forming region is formed on a substrate; wherein:
the waveguide forming region is comprised of:
at least one optical input waveguide;
a first slab waveguide connected to an output side of the at least one optical input waveguide;
an arrayed waveguide connected to an output side of the first slab waveguide, and includes a plurality of channel waveguides arranged side by side and has different lengths of a set amount;
a second slab waveguide connected to an output side of the arrayed waveguide; and
a plurality of optical output waveguides connected to an output side of the second slab waveguide, and arranged side by side; and at least one of the first slab waveguide and the second slab waveguide is separated at a plane intersected to a path of light passing through the slab waveguide so as to form separated slab waveguides; and wherein:
the arrayed waveguide grating optical multiplexer/demultiplexer is further comprised of:
a slide moving member for slide-moving at least one of the separated slab waveguides along said separating plane, depending upon a temperature; and
a positional shift suppressing member for suppressing an optical axis shift along a Z direction perpendicular to substrate of the separated slab waveguides by depressing the waveguide forming region; and wherein:
a position depressing the waveguide forming region by the positional shift suppressing member is formed at such a position escaped from the optical axis of the separated slab waveguides.

BRIEF DESCRIPTION OF THE DRAWINGS

Exemplary embodiments of the invention will now be described with reference to the accompanying drawings, wherein.

DETAILED DESCRIPTION

On the other hand, since the arrayed waveguide grating mainly and originally employs a silica-based glass material, the above-described light transmission center wavelength of the arrayed waveguide grating will be shifted, depending upon a temperature due to the temperature depending characteristic of this silica-based glass material.

This temperature depending characteristic is substantially expressed by the following formula (6):

$$\frac{d\lambda}{dT} = \frac{\lambda \cdot dn_c}{n_c dT} + \lambda \alpha_B \quad \text{(formula 6)}.$$

where, symbol "λ" shows a light transmission center wavelength of light outputted from one of the optical output waveguides 6 each other; symbol "$n_c$" shows an equivalent index of a core which forms the above-explained arrayed waveguide 4; symbol "$\alpha_B$" indicates a thermal expansion coefficient of a substrate (e.g. a silicon substrate); and symbol "T" indicates a temperature change amount of the arrayed waveguide grating.

In this case, in the conventional arrayed waveguide grating, a temperature depending characteristic of the above-described light transmission, center wavelength will now be acquired based upon the above-described formula (6). That is, since $dn_c/dT=1\times10^{-5}$ (° C.$^{-1}$) and $\alpha_B=3.0\times10^{-6}$ (° C.$^{-1}$) in the conventional arrayed waveguide grating, these values are entered into the formula (6).

While the wavelengths "λ" are different from each other as to the respective optical output waveguides 6, the temperature depending characteristics of the respective wavelengths α are equal. Then, the arrayed waveguide gratings are mainly employed so as to multiplex and/or to demultiplex wavelength-multiplexed division light having such a wavelength range in which a wavelength of 1550 nm is located as a center. Therefore, in this case, λ=1550 nm and $n_c$=1.451 (value in wavelength of 1.55 μm) are entered into the formula (6). As a result, the temperature depending characteristic dλ/dT of the above-explained light transmission center wavelength of the conventional arrayed waveguide grating may be equal to dλ/dT=0.011 (nm/° C.).

Figure 18:
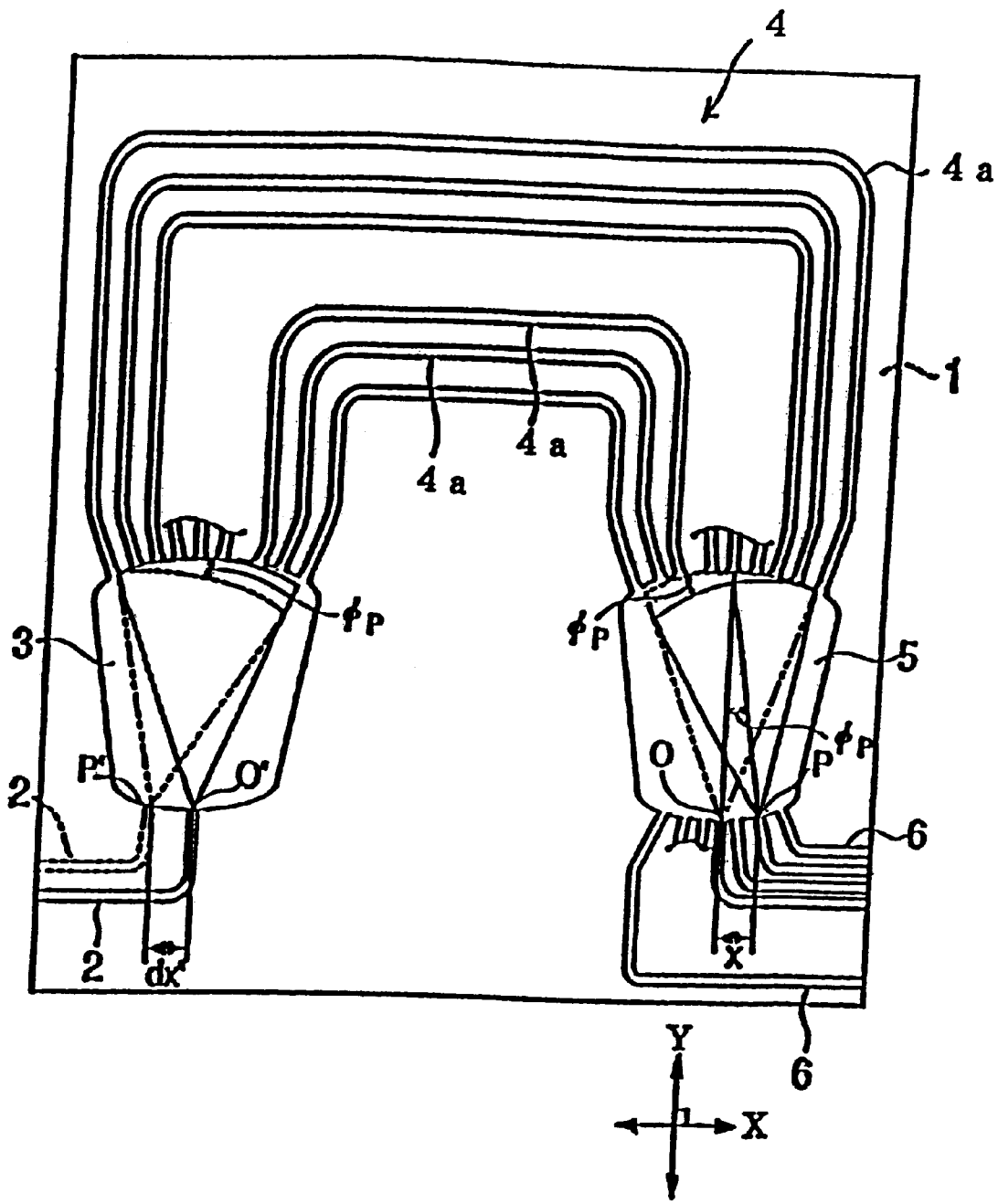
FIG. 18 is an explanatory diagram for representing a relationship between the shift of the light transmission center wavelength and the positions of both the optical input waveguide and the optical output waveguide in the arrayed waveguide grating.

In this case, it is so assumed that the light transmission center wavelength of the light outputted from each of the optical output waveguides of the arrayed waveguide grating is shifted by "Δλ" due to the temperature variation. Based upon the above-explained discussion, if the output end position of the optical input waveguide 2 shown in FIG. 18 is shifted by, for example, a distance "dx'" along the above-described X direction in order to satisfy dλ'=Δλ, then such light having no wavelength shift can be derived in the optical output waveguide 6 which is formed at the focal point "O." Also, since a similar effect may be achieved as to other optical output waveguide 6, the above-described shift Δλ of the light transmission center wavelength can be corrected (canceled).

In this case, a relationship between a temperature change amount and a position correction amount of the light input waveguide is conducted. As previously explained, since the temperature depending characteristic of the light transmission center wavelength (shift amount of light transmission center wavelength caused by temperature) is expressed by dλ/dT=0.011 (nm/° C.), the light transmission center wavelength shift amount "Δλ" may be substantially expressed by using the temperature change amount "T" by way of the following formula (7):

$$\Delta\lambda = \frac{d\lambda}{dT}T \quad \text{(formula 7)}.$$

When both the temperature change amount "T" and the position correction amount "dx'" of the optical input waveguide 2 are calculated by performing this formula (7) and the above-explained formula (5), the below-mentioned formula (8) may be substantially conducted:

$$dx' = \frac{L'_f \cdot \Delta L}{n_s \cdot d \cdot \lambda_0} n_g \frac{d\lambda}{dT}T \quad \text{(formula 8)}.$$

Based on the above-described discussions, such an arrayed waveguide grating type optical multiplexer/demultiplexer with employment of the below-mentioned structure has been proposed. This proposed arrayed waveguide grating type optical multiplexer/demultiplexer is constructed by that at least one of a first slab waveguide 3 and a second slab waveguide 5 of the arrayed waveguide grating is separated on a plane which is intersected with a path of light passing through the slab waveguide so as to constitute separated slab waveguides. Also, this proposed arrayed waveguide grating type optical multiplexer/demultiplexer employs a slide moving member. This slide moving member moves at least one of these separated slab waveguides along this separation plane, depending upon a temperature.

Figure 16:
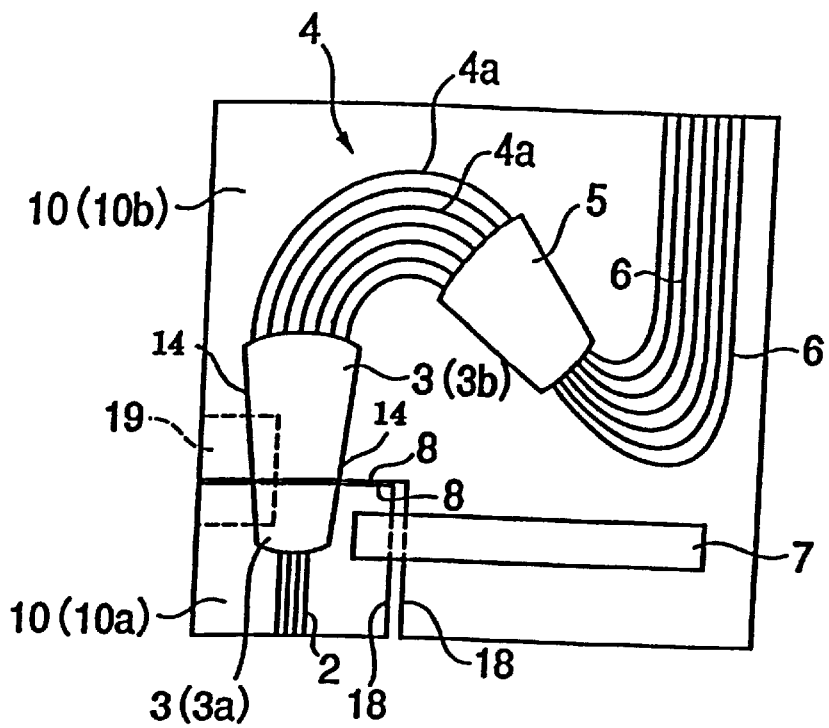
FIG. 16 is an explanatory diagram for indicating the arrayed waveguide grating type optical multiplexer/demultiplexer proposed by way of the plan view.

For instance, as indicated in FIG. 16, in the arrayed waveguide grating type optical multiplexer/demultiplexer, the first slab waveguide 3 is separated to constitute two separated slab waveguides 3a and 3b. Then, both the separated slab waveguide 3a and the optical input waveguides 2 are moved along a separating plane 8 by the position correction amount dx' indicated in the above formula (8) by a slide moving member 7. As a result, the arrayed waveguide grating type optical multiplexer/demultiplexer may cancel the above-explained light transmission center wavelength shift.

It should also be noted that the arrayed waveguide grating corresponds to such a planar lightwave circuit in which a waveguide forming region 10 is formed on a silicon substrate 1 by executing a frame hydrolysis deposition (FHD) method for depositing glass fine particles and sintering these glass. The arrayed waveguide grating may sometimes own a slight curve because of a difference in linear expansion coefficients between silicon used to form the substrate 1 and glass used to form the waveguide forming region 10.

As a result, in the proposed arrayed waveguide grating type optical multiplexer/demultiplexer, there are some possibilities that both a first waveguide forming region 10a having one separated slab waveguide 3a and a second waveguide forming region 10b having the other separated slab waveguide 3b are shifted along a Z direction perpendicular to the plane of the substrate.

As a consequence, since both an optical axis of one separated slab waveguide 3a and an optical axis of the separated slab waveguide 3b are shifted along the Z direction, one proposed idea has been made in order to suppress this shift of these optical axes. That is, since a positional shift suppressing member such as a clip is employed, the optical axis shifts of the separated slab waveguides 3a and 3b along the Z direction may be suppressed.

However, in the case that the positional shift suppressing member is provided with the arrayed waveguide grating for separating either the first slab waveguide or the second slab waveguide, the following fact can be found out. That is, optical characteristics are deteriorated, for example, the losses of the respective light transmission center wavelengths of the arrayed waveguide grating are increased.

As an example of the present invention, such an arrayed waveguide grating type optical multiplexer/demultiplexer capable of correctly suppressing a temperature depending characteristic of a light transmission center wavelength, and also having a small insertion loss is provided.

Referring now to the accompanying drawings, a description will be made of various preferred embodiments of the present invention. It should be understood that the same reference numerals employed in both the prior art and the proposed example are used for denoting the same, or similar structural elements, and explanations are omitted thereof.

Figure 1A:
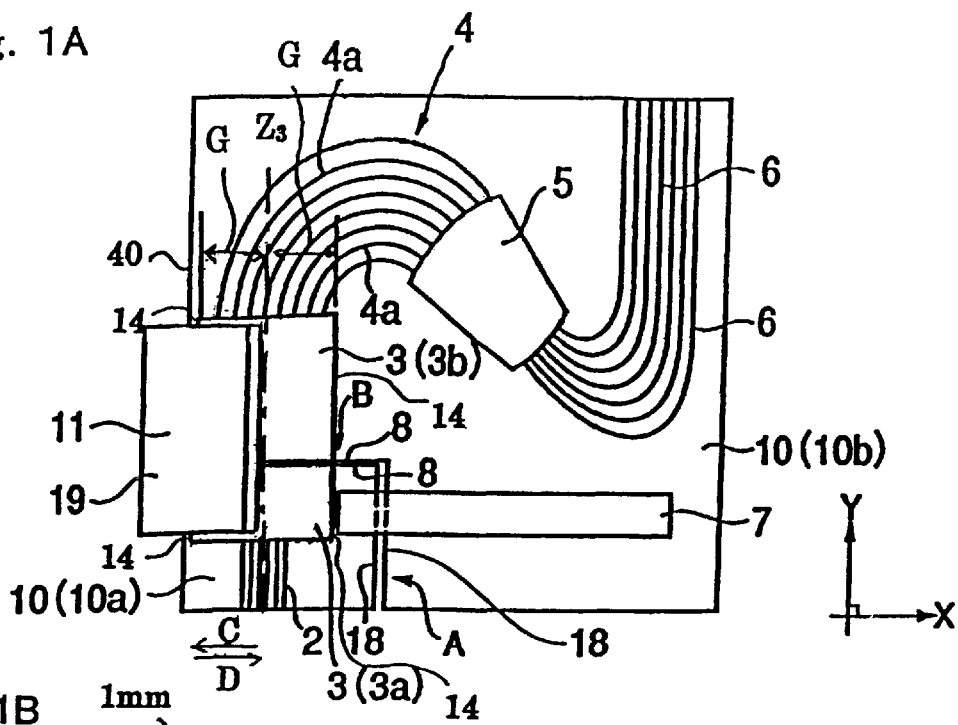
FIG. 1A is a structural diagram for indicating a major structure of an arrayed waveguide grating type optical multiplexer/demultiplexer according to a first embodiment of the present invention by way of a plan view.
Figure 1B:
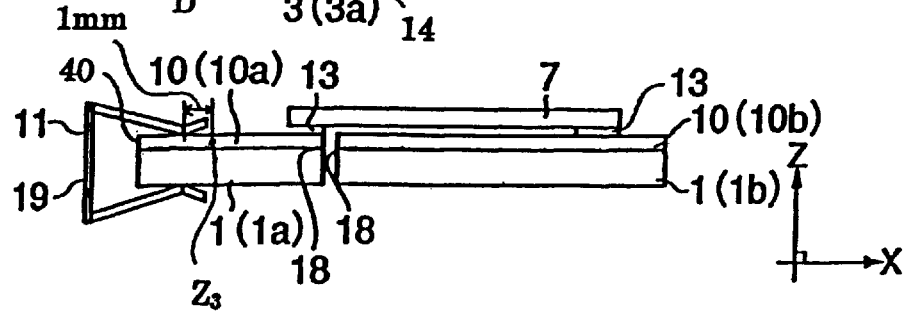
FIG. 1B is a structural diagram for indicating a major structure of the arrayed waveguide type optical multiplexer/demultiplexer according to the first embodiment by way of a front view.

FIG. 1A is a structural diagram for indicating a major structure of an arrayed waveguide grating type optical multiplexer/demultiplexer according to a first embodiment of the present invention by way of a plan view. FIG. 1B is a structural diagram for indicating a major structure of the arrayed waveguide type optical multiplexer/demultiplexer according to the first embodiment by way of a front view.

As shown in FIG. 1A and Fig. B, the first embodiment is featured that a first slab waveguide 3 is formed in a rectangular shape in a waveguide structure of an arrayed waveguide grating. Then, this first slab waveguide 3 is separated by an cross separating plane 8 to obtain two sets of separated slab waveguides 3a and 3b, while this cross separating plane 8 is intersected with a path of light which passes through the first slab waveguide 3.

With employment of this structure, in these separated slab waveguides 3a and 3b, both side surfaces 14 thereof are located substantially parallel to an optical axis $Z_3$ of the separated slab waveguides 3a and 3b. A distance "G" between the optical axis $Z_3$ and the side surface 14 of each of the separated slab waveguides 3a and 3b is equal to 3.7 mm.

Also, the optical axis $Z_3$ of the separated slab waveguides 3a and 3b is formed in such a manner that while this optical axis is located in proximity to the side surfaces 14 of these separated slab waveguides 3a and 3b, this optical axis $Z_3$ is positioned substantially parallel to the side surface 40 of a planar lightwave circuit along these separated slab waveguides 3a and 3b.

The cross separating plane 8 is provided from one edge side (namely, side of side surface 40) of the waveguide forming region 10 to a half way portion of the waveguide forming region. A non-cross separating plane 18 which is not intersected to the first slab waveguide 3 is formed while this non-cross separating plane 18 is connected to the intersecting/cross separating plane 8. The non-cross separating plane 18 is formed to be intersected perpendicular to the cross separating plane 8. It should be noted that the non-cross separating plane 18 need not be intersected perpendicular to the cross separating plane 8, but FIG. 1A represents such a mode that this non-cross separating plane 18 is intersected perpendicular to the cross separating plane 8.

In accordance with the first embodiment, the waveguide forming region 10 is separated into a first waveguide forming region 10a and a second waveguide forming region 10b by both the cross separating plane 8 and the non-cross separating plane 18, while the first waveguide forming region 10a contains the separated slab waveguide 3a provided on one side, and the second waveguide forming region 10b contains the separated slab waveguide 3b provided on the other side. Also, in correspondence with the waveguide forming regions 10a and 10b, the substrate 1 is separated into two sets of substrates 1a and 1b by way of both the cross separating plane 8 and the non-cross separating plane 18.

A slide moving member 7 whose thermal expansion coefficient is larger than that of the waveguide forming region 10 is provided in such a mode that this slide moving member 7 bridges both the first waveguide forming region 10a and the second waveguide forming region 10b. As indicated in FIG. 1B, one end side of this slide moving member 7 is fixed to the first waveguide forming region 10a by using an adhesive agent 13, and the other end side thereof is fixed to the second waveguide forming region 10b by employing the adhesive agent 13.

This slide moving member 7 is constructed in such a manner that this slide moving member 7 may move the first waveguide forming region 10a along the cross separating plane 8 depending upon a temperature, and also may move the separated slab waveguide 3a along the cross separating plane 8. As indicated by arrows C and D of FIG. 1A, the separated slab waveguide 3a may be moved.

Also, in the first embodiment, since the slide moving member 7 is provided on the surfaces of the waveguide forming regions 10a and 10b in such a mode that this slide moving member 7 bridges both the waveguide forming region 10a and the waveguide forming region 10b, the below-mentioned effect can be achieved. That is, when the slide moving member 7 moves the waveguide forming region 10a, such a suppression effect may be achieved. This slide moving member 7 can suppress as much as possible that the waveguide forming region 10a is shifted along the Z direction perpendicular to the plane of the substrate.

The above-described slide moving member 7 is manufactured by, for example, a copper plate whose thermal expansion coefficient is substantially equal to $1.65 \times 10^{-5}$ (1/K). The length of this slide moving member 7 is formed by which the temperature depending characteristic of the light transmission center wavelength of the arrayed waveguide grating can be compensated. In other words, the length of this slide moving member 7 is compressed/expanded due to the thermal expansion coefficient thereof by such a length corresponding to a move amount of the separated slab waveguide 3a in response to the shift of the light transmission center wavelength of the arrayed waveguide grating, so that the output end of the optical input waveguides 2 is moved by such a distance "dx'" indicated in the above formula (5).

It should also be noted that since the first waveguide forming region 10a is separated from the second waveguide forming region 10b, these regions 10a and 10b are arranged via an interval. For example, an interval of an A portion (namely, interval between non-cross separating plane 18) is selected to be on the order of approximately 100 μm, and an interval of a B portion (namely interval between cross separating planes 8) indicated in FIG. 1A is selected to be on the order of approximately 25 μm.

Also, in the first embodiment, a positional shift suppressing member 11 is provided which may suppress that the optical axis of the separated slab waveguides 3a and 3b is shifted along the Z direction. This positional shift suppressing member 11 is formed by a two-cornered clip 19, while this clip 19 depresses the waveguide forming region 10 from the upper side (front surface side) of the first slab waveguide 3, and furthermore, depresses the board 1 from the lower side (rear surface side) of the substrate 1.

The clip 19 is constructed in such a manner that this clip 19 clips the arrayed waveguide grating corresponding to the planar lightwave circuit so as to apply thereto stress of weight approximately 2.5 Kgf. A depressing position of the waveguide forming region 10 by the clip 19 is formed at such a position that the optical axis of the separated slab waveguides 3a and 3b is escaped by this depressing position. This depressing position is set to such a position which is located parallel to the optical axis of the separated slab waveguides 3a and 3b, and is separated from this optical axis by 1 mm. A length of this depressing position is set to be 13 mm, and is substantially equal to the length of the first slab waveguide 3.

It should also be noted that griping action by the clip 19 never disturbs the slide movement along the cross separating plane 8 of the first waveguide forming region 10a. Both the first waveguide forming region 10a and the substrate 1a located under the first waveguide forming region 10a are gripped by the clip 19 in such a manner that the first waveguide forming region 10a and the substrate la may be moved along the cross separating plane 8 with respect to the second waveguide forming region 10b by the slide moving member 7.

On the other hand, the inventors of the present invention have investigated such a relationship between the arranging mode of the positional shift suppressing member 11 such as the clip 19, and also an optical characteristic of the arrayed waveguide grating type optical multiplexer/demultiplexer. While this investigation was carried out, first of all, at least one of the first slab waveguide 3 and the second slab waveguide 5 of the arrayed waveguide grating was separated by a separating plane so as to form separated slab waveguides. In this case, while the first slab waveguide 3 was separated so as to form the separated slab waveguides 3a and 3b, the arrayed waveguide grating type optical multiplexer/demultiplexer was formed. This optical multiplexer/demulplexer has such a construction that at least one of these separated slab waveguides 3a and 3b were moved along the separating plane, depending upon the temperature. Also, such a positional shift suppressing member was provided which could suppress an optical axis shift between these separated slab waveguides along the Z direction perpendicular to the plane of the substrate.

Then, the inventors could find out such a fact that the deterioration of the optical characteristic is largely made different from each other, depending upon the depressing position by the positional shift suppressing member, as a result of searching of a reason why the optical characteristic is deteriorated by employing the positional shift suppressing member. Both the investigation and the investigated results made by the inventors will now be described.

First, similar to the prior art shown in FIG. 16, while the waveguide structure was formed in the arrayed waveguide grating type optical multiplexer/demultiplexer, the first slab waveguide 3 was separated by the cross separating plane 8 to form the separated slab waveguides 3a and 3b. Then, the clip 19 shown by a broken line of FIG. 16 was provided as the positional shift suppressing member on the upper side of the cross separating plane 8, and thereafter, the transmission loss wavelength characteristic was acquired.

Figure 17:
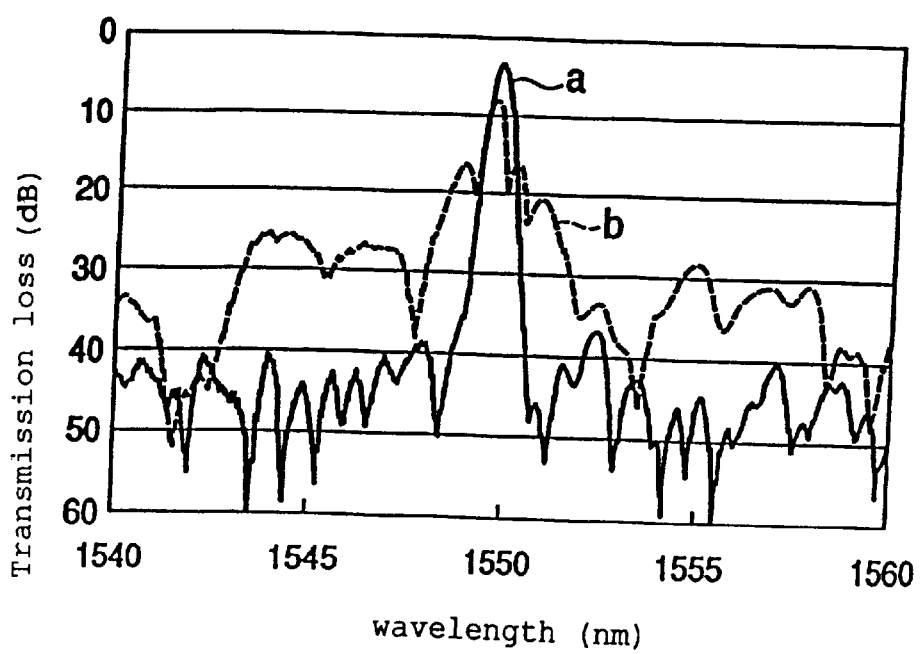
FIG. 17 is a graph for graphically showing an insertion loss characteristic when the clip depressing position is changed in the arrayed waveguide grating type optical multiplexer/demultiplexer indicated in FIG. 16.

As a result, in the case that the depressing position by the clip 19 is located other than the optical transmission region of the first slab waveguide 3, it could be found out that the transmission loss wavelength characteristic of the arrayed waveguide grating could be better as indicated by a characteristic line "a" of FIG. 17. Also, in the case that the depressing position by the clip 19 is located on the optical axis of the first slab waveguide 3 and also in the vicinity of this optical axis, it could be understood that the transmission loss wavelength characteristic was largely deteriorated as shown in a characteristic "b" of FIG. 17.

As a consequence, the inventors have studied more in detail such a relationship between the depressing positions by the clip 19 and the transmission losses of the arrayed waveguide grating, while the clip 19 was applied as the positional shift suppressing member.

Figure 5:
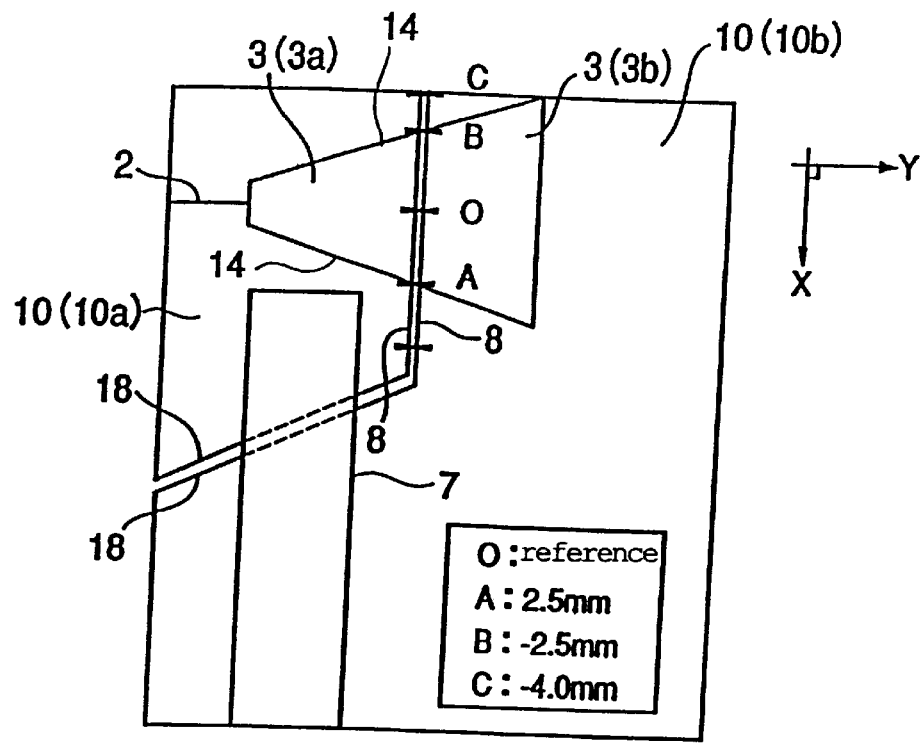
FIG. 5 is an explanatory diagram for explaining a clip depressing position in an arrayed waveguide grating type optical multiplexer/demultiplexer having separated slab waveguides whose width is expanded along a direction toward the side of the arrayed waveguide.

As shown in FIG. 5, this characteristic investigation result was obtained as follows. That is, as represented in FIG. 5, while a center line of the optical axis of the separated slab waveguides 3a and 3b is set as "O" (namely, origin of coordinate system along X direction), in such a case that the depressing position by the clip 19 is located outside (upper side of FIG. 5) the center line of the optical axis "O", the characteristic investigation result was acquired as minus (−), whereas in the case that the depressing position by the clip 19 is located inside (lower side of FIG. 5) the center line of the optical one's "O", the characteristic investigation result was acquired as plus (+). Also, the weight which was applied by the clip 19 to the arrayed waveguide grating was selected to be 2.5 kgf.

Figure 6:
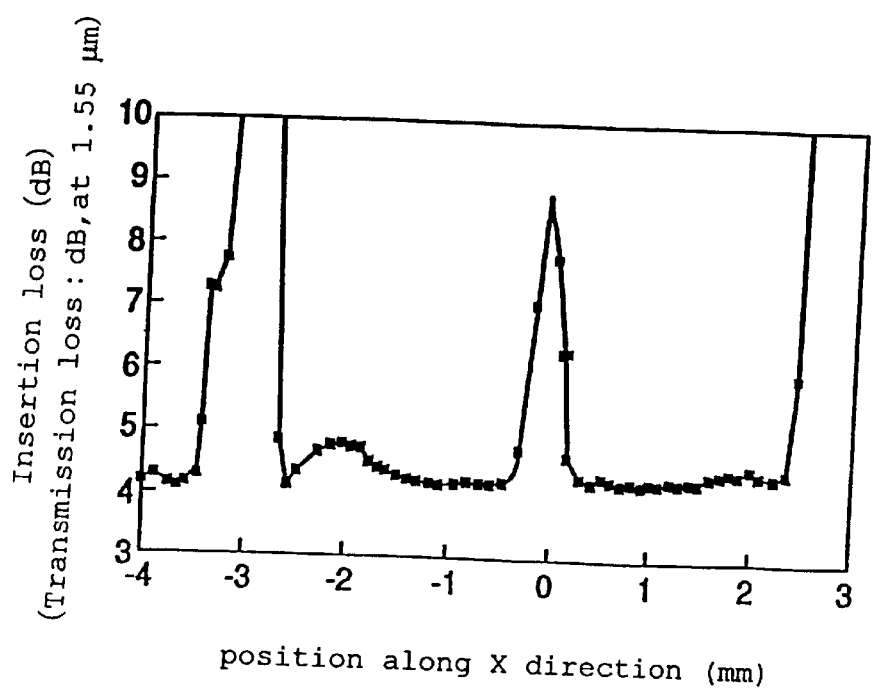
FIG. 6 is a graph for graphically showing a variation of insertion losses caused by the clip depressing position in the arrayed waveguide grating type optical multiplexer/demultiplexer having the separated slab waveguides whose width is expanded along the direction toward the side of the arrayed waveguide.

As a result, as shown in FIG. 6, it could be found out that such a insertion loss (transmission loss at wavelength $\lambda=1.55\,\mu m$) when the depressing position by the clip 19 was changed from a position of −4.0 mm up to another position of 3.0 mm was largely different from each other, depending upon the depressing position by the clip 19. Then, the following fact could be found out. That is, in the case that the depressing position by the clip 19 was set on the optical axis of the separated slab waveguides 3a and 3b, and was located at a position in the vicinity of this optical axis (for example, position smaller than ±0.3 mm while optical axis of separated slab waveguide is set as a center), the insertion loss was largely increased.

Also, as indicated in FIG. 5, the shape of the first slab waveguide 3 which is formed in the conventional arrayed waveguide grating type optical multiplexer/demultiplexer is such a shape that the width thereof is widened along the side of the arrayed waveguide 4. In such a case that the first slab waveguide 3 has this shape, the depressing position by the clip 19 is separated far from the optical axis of the separated slab waveguides 3a and 3b, and then is approached to the side surface 14, the depressing line by the clip 19 may be intersected with the side surfaces 14 of the separated slab waveguides 3a and 3b.

As a result, there is a possibility that the depressing by the clip 19 is not carried out under better condition by a small stepped portion formed on the surface of the waveguide forming region 10 which is formed at the forming portions of the side surfaces 14 of the separated slab waveguides 3a and 3b. Under such a circumstance, in accordance with the first embodiment of the present invention, while the first slab waveguide 3 was formed in the rectangular shape, both the side surfaces 14 of the separated slab waveguides 3a and 3b were positioned substantially parallel to the optical axis of the separated slab waveguides 3a and 3b.

Figure 14:
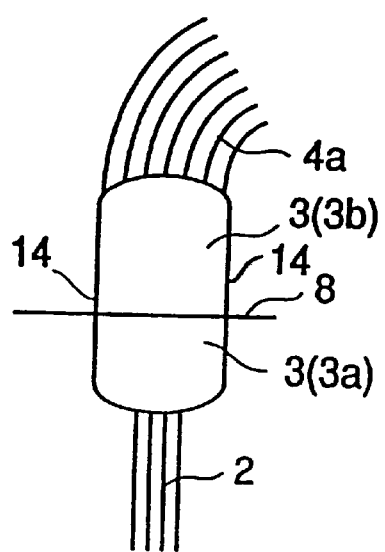
FIG. 14 is an explanatory diagram for explaining an example of a first slab waveguide which is formed in the arrayed waveguide grating type optical multiplexer/demultiplexer according to another embodiment of the present invention.

Although the first slab waveguide 3 is formed in the rectangular shape in the first embodiment, the shape of this first slab waveguide 3 may be formed as illustrated in, for example, FIG. 14. That is to say, while both the input end side and the output end side of the first slab waveguide 3 are made of a curved shape, both the side surfaces of the first slab waveguide 3 may be formed in parallel to the optical axis of the first slab waveguide 3. This structure is also such a structure that both the side surfaces 14 of the separated slab waveguides 3a and 3b are located substantially parallel to the optical axis of the separated slab waveguides 3a and 3b.

Figure 3:
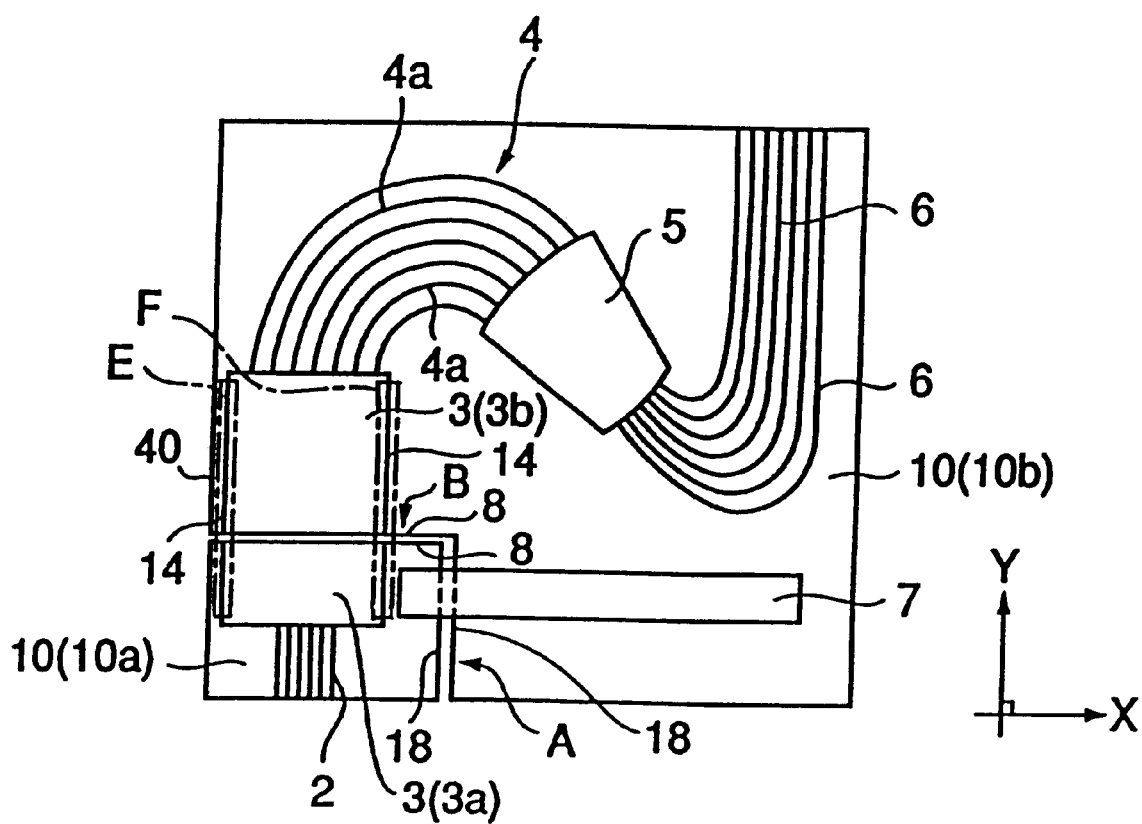
FIG. 3 is an explanatory diagram for explaining such a condition that a side surface of separated slab waveguides of the arrayed waveguide grating type optical multiplexer/demultiplexer is depressed by a clip, in which both side surfaces of the separated slab waveguides are formed substantially parallel to an optical axis of the separated slab waveguides.

In the case that the separated slab waveguides 3a and 3b are formed as explained above in such a manner that both side surfaces 14 of the separated slab waveguides 3a and 3b are located substantially parallel to the optical axis of the separated slab waveguides 3a and 3b, the below-mentioned effects may be achieved. That is, while the depressing position by the clip 19 is separated far from the optical axis of the separated slab waveguides 3a and 3b longer than, or equal to 3.0 mm, even when an upper portion of the side surface 14 is depressed by the clip 19 as shown in, for example, dash lines E and F of FIG. 3, the depressing line by the clip 19 is not intersected with the side surface 14 (namely, does not become point contact). Such a construction that both the side surfaces 14 of the separated slab waveguides 3a and 3b are located substantially parallel to the optical axis of the separated slab waveguides 3a and 3b may widen such a range that the depressing operation by the clip 19 can be carried out under better condition.

Figure 4:
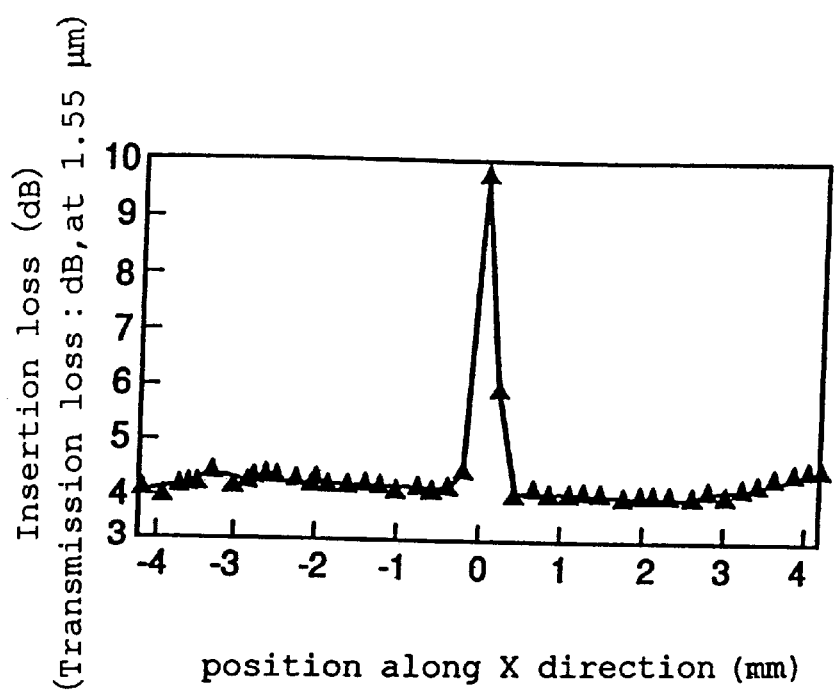
FIG. 4 is a graph for graphically indicating an insertion loss characteristic of the arrayed waveguide grating type optical multiplexer/demultiplexer of the first embodiment when the depressing position by the clip is changed.

When the separated slab waveguides 3a and 3b are formed as explained in the first embodiment, the insertion loss occurred in the case that the depressing position by the clip 19 is changed from the position of −4.0 mm up to the position of 4.0 mm may be indicated as in FIG. 4. As apparent from FIG. 4, when it is so arranged that both the side surfaces 14 of the separated slab waveguides 3a and 3b are located substantially parallel to the optical axis of the separated slab waveguides 3a and 3b, since such an area that the insertion loss is small is widened, the range of the depressing position by the clip 19 may be made wider.

Even when the shape of the first slab waveguide 3 and the shapes of the separated slab waveguides 3a and 3b are made same as those of the first embodiment, an optical characteristic of the arrayed waveguide grating is similar to the optical characteristic of the arrayed waveguide grating in that width of the first slab waveguide 3 and the separated slab waveguide 3a, 3b is widened along the side of the arrayed waveguide 4.

Also, even when the shape of the first slab waveguide 3 and the shapes of the separated slab waveguides 3a and 3b are made same as those of FIG. 14, an optical characteristic of the arrayed waveguide grating is similar to the optical characteristic of the arrayed waveguide grating in that width of the first slab waveguide 3 and the separated slab waveguide 3a, 3b is widened along the side of the arrayed waveguide 4.

The first embodiment is featured by such an assumption that the depressing position of the waveguide forming region 10 by the clip 19 corresponding to the positional shift suppressing member 11 is located to such a position separated far from the optical axis of the separated slab waveguides 3a and 3b by 1 mm.

As explained above, in accordance with the first embodiment, since the depressing position by the positional shift suppressing member 11 is set to such a position which is escaped from the optical axis of the separated slab waveguides 3a and 3b, even when the depressing position by the positional shift suppressing member 11 is slightly fluctuated, or slightly changed, the optical axis shifts of the separated slab waveguides 3a and 3b along the Z direction may be suppressed.

As a consequence, the first embodiment can suppress that the insertion loss is increased by forming the separated slab waveguides 3a/3b, and by moving the separated slab waveguides 3a and 3b along the cross separating plane 8 of the separated slab waveguide 3a, and thus, can obtain such a stable condition that the insertion loss cannot be hardly deteriorated.

More specifically, according to the first embodiment, since the depressing position of the waveguide forming region 10 by the positional shift suppressing member 11 is set to such a position separated far from the optical axis of the separated slab waveguides 3a and 3b longer than, or equal to 0.3 mm, the increase of the above-described insertion loss can be more properly suppressed.

Furthermore, in accordance with the first embodiment, since the waveguide forming region 10 is depressed from the surface sides of the separated slab waveguides 3a/3b by the positional shift suppressing member 11, the positional shifts of the separated slab waveguides 3a and 3b along the Z direction can be suppressed under better condition. Also, the above-described increase of the insertion loss can be furthermore suppressed in more proper manners.

In addition, in accordance with the first embodiment, since the substrate 1 is also depressed from the lower side (namely, rear surface side) by the positional shift suppressing member 11, the positional shifts of the separated slab waveguides 3a and 3b along the Z direction can be suppressed under better condition. Also, the above-described increase of the insertion loss can be furthermore suppressed in more proper manners.

It should be noted that in the first embodiment mode, at least one of these separated slab waveguides 3a and 3b is moved along the cross separating plane. In FIG. 1, the separated slab waveguide 3a is moved along the cross separating plane 8. As a result, the optical axis of the separated slab waveguide 3a of the moving side is moved along the X direction, this move distance is such a value of on the order of μm, namely very small. As a result, as explained above, while the optical axis of the separated slab waveguide 3a before being moved is employed as a reference, if such a position escaped from this optical axis is set to the depressing position of the positional shift suppressing member 11, then the increase of the insertion loss can be suppressed as explained above.

Figure 2:
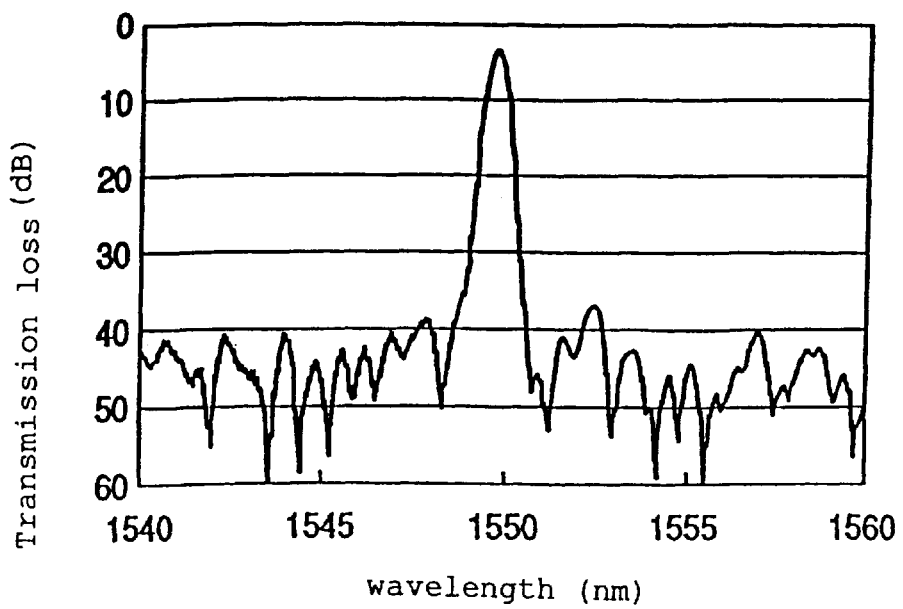
FIG. 2 is a graph for graphically showing a transmission loss wavelength characteristic of the first embodiment.

FIG. 2 shows an example of a transmission loss wavelength characteristic of the first embodiment. As shown in FIG. 2, the arrayed waveguide grating type optical multiplexer/demultiplexer of the first embodiment can obtain such a waveform that the insertion loss is lower than, or equal to 5 dB, and the crosstalk is lower than, or equal to −28 dB.

As explained above, in accordance with the first embodiment, since the depressing position by the positional shift suppressing member 11 is properly set, the adverse influence given to the optical path of the light which passes through the first slab waveguide 3 can be suppressed. As a consequence, such a confirmation can be made that the resulting multiplexer/demultiplexer corresponds to such an arrayed waveguide grating type optical multiplexer/demultiplexer having substantially no fluctuation of the optical characteristic such as the insertion loss.

Furthermore, in accordance with the first embodiment, since the waveguide forming region 10a containing the separated slab waveguide 3a is moved along the cross separating plane 8 by the slide moving member 7 depending upon the temperature, the temperature depending characteristic of the light transmission center wavelength can be correctly suppressed.

In addition, in the first embodiment, the optical axis of the separated slab waveguides 3a and 3b is formed substantially parallel to the side surface 40 of the planar lightwave circuit in proximity to the side surfaces 14 of these separated slab waveguides 3a and 3b. As a consequence, in accordance with the first embodiment, since the waveguide forming regions can be easily depressed by the positional shift suppressing member 11, these waveguide forming regions can be depressed in more proper manners.

Figure 7A:
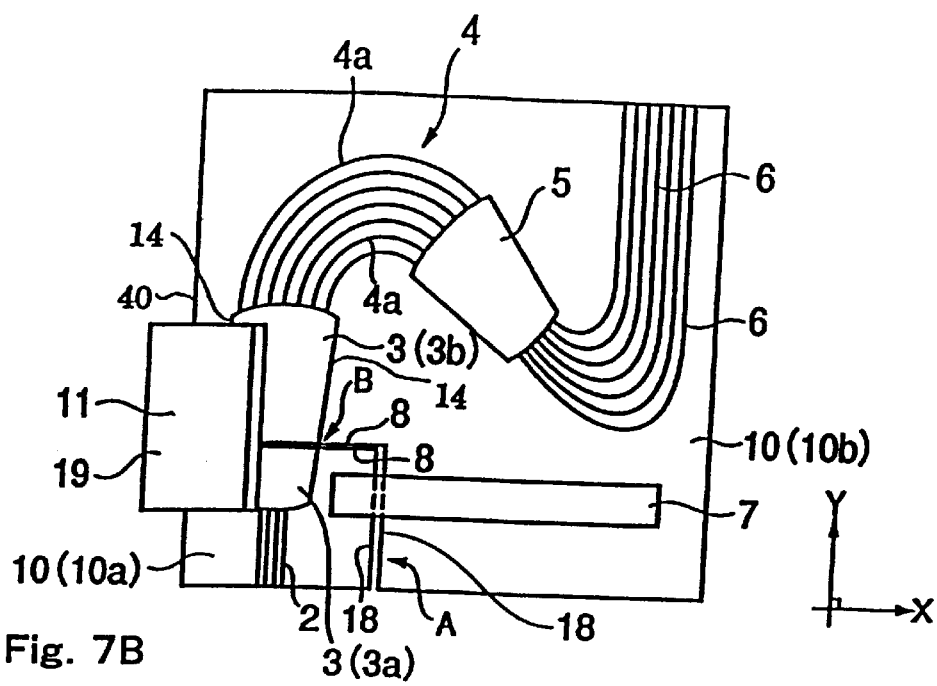
FIG. 7A is a structural diagram for indicating a major structure of an arrayed waveguide grating type optical multiplexer/demultiplexer according to a second embodiment of the present invention by way of a plan view.
Figure 7B:
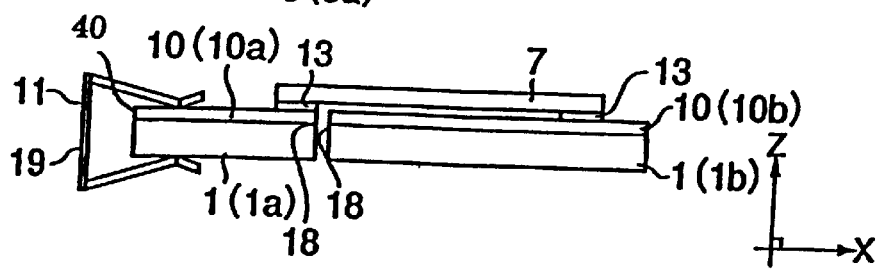
FIG. 7B is a structural diagram for indicating the arrayed waveguide type optical multiplexer/demultiplexer according to the second embodiment by way of a front view.

FIG. 7A is a structural diagram for indicating a major structure of an arrayed waveguide grating type optical multiplexer/demultiplexer according to a second embodiment of the present invention by way of a plan view. FIG. 7B is a structural diagram for indicating the arrayed waveguide type optical multiplexer/demultiplexer according to the second embodiment by way of a front view. As shown in FIG. 7A, the second embodiment is featured by that a width of a first slab waveguide 3 employed in the arrayed waveguide grating type optical multiplexer/demultiplexer is widened toward the side of the arrayed waveguide 4. It should be noted that structures of the second embodiment other than this structure are made similar to those of the first embodiment, and therefore, descriptions of the same structures as those of the first embodiment are omitted.

Since the shape of the first slab waveguide 3 according to the second embodiment is made different from the shape of the first embodiment, while an entire width of a position depressed by the clip 19 is narrower than that of the first embodiment, a similar effect to that of the first embodiment may be achieved because other structures of this second embodiment are similar to those of the first embodiment.

Figure 8:
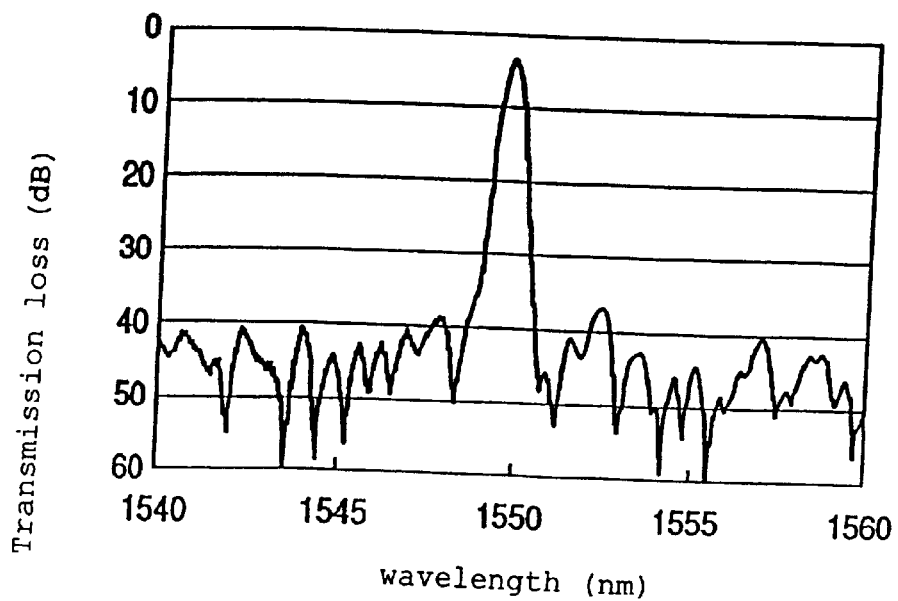
FIG. 8 is a graph for graphically showing a transmission loss wavelength characteristic of the second embodiment.

FIG. 8 shows an example of a transmission loss wavelength characteristic of the second embodiment. This transmission loss wavelength characteristic shown in FIG. 8 was similar to the transmission loss wavelength characteristic of the first embodiment shown in FIG. 2.

Figure 9A:
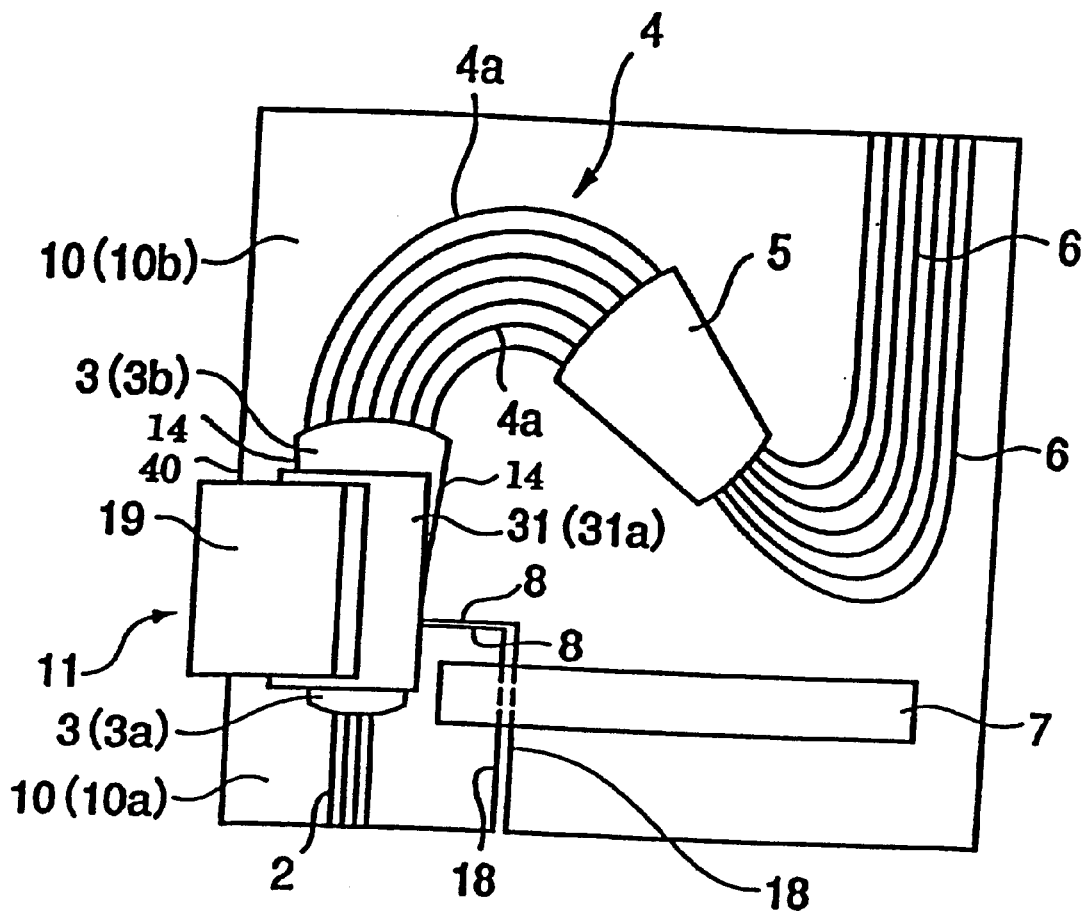
FIG. 9A is a structural diagram for indicating a major structure of an arrayed waveguide grating type optical multiplexer/demultiplexer according to a third embodiment of the present invention by way of a plan view.
Figure 9B:
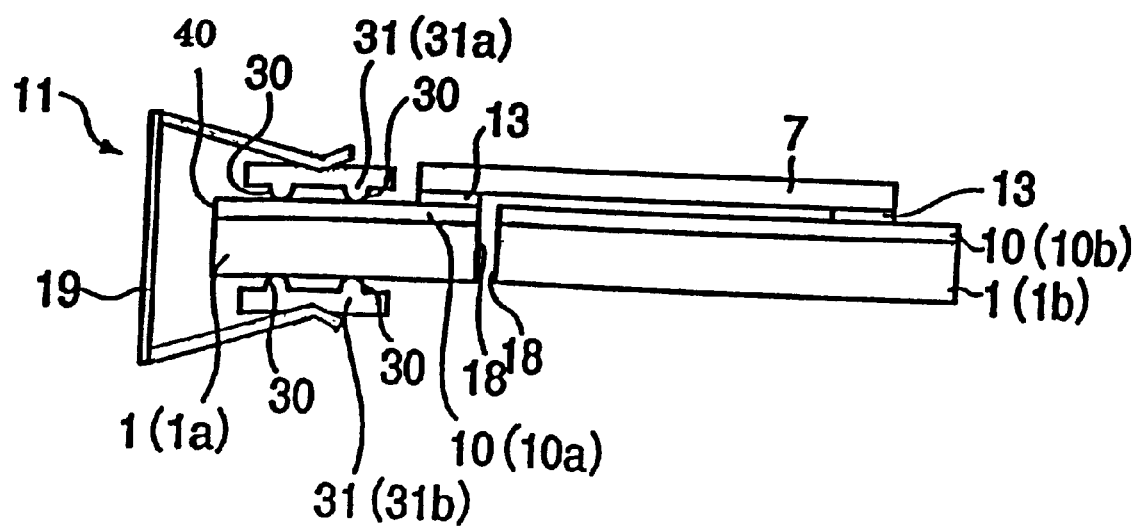
FIG. 9B is a structural diagram for indicating the arrayed waveguide type optical multiplexer/demultiplexer according to the third embodiment by way of a front view.

FIG. 9A is a structural diagram for indicating a major structure of an arrayed waveguide grating type optical multiplexer/demultiplexer according to a third embodiment of the present invention by way of a plan view. FIG. 9B is a structural diagram for indicating the arrayed waveguide type optical multiplexer/demultiplexer according to the third embodiment by way of a front view. It should be noted that structures of the third embodiment are made similar to those of the second embodiment, and therefore, descriptions of the same structures as those of the first embodiment are omitted. The third embodiment has a different featured structure than that of the second embodiment, namely the positional shift suppressing member 11 is arranged as follows:

In the third embodiment, the positional shift suppressing member 11 contains a clip 19 and two depression bases 31 (31a and 31b). This clip 19 functions as a stress applying arm which clips the planar lightwave circuit from the front surface side of the waveguide forming region 10 and the rear surface side of the substrate 1. Two sets of curved plane forming portions 30, the diameter of which is larger than, or equal to 0.1 mm, are arranged via an interval on the depression base 31.

The positional shift suppressing member 11 is arranged in such a manner that the planar lightwave circuit is depressed via the depression base 31 by the clip 19, whereas both the front surface side of the waveguide forming region 10 and the rear surface side of the substrate 1 are depressed by two linear regions via an interval by employing the curved plane forming portions 30.

In other words, the depressing position of the waveguide forming region 10 by the positional shift suppressing member 11 constitutes two linear regions separated from each other via an interval. Further, the positional shift suppressing member 11 depresses the two linear regions of the rear surface of the substrate 1 from the lower side of the board 1 in correspondence with the depressing position of the waveguide forming region 10. The interval of these two linear regions is 4 mm.

Also, the depression base 31 is arranged in such a manner that a center of the interval of the above-described linear regions is made coincident with the optical axis of the first slab waveguide 3. As a result, both the depressing position of the waveguide forming region 10 and the depressing position of the substrate 1 by the positional shift suppressing member 11 are located from the optical axis of the first slab waveguide 3 by 2 mm, respectively. In other words, the depressing position of the waveguide forming region 10 and the depressing position of the substrate 1 by the positional shift suppressing member 11 are located at a position of +2 mm and another position of −2 mm along the X direction.

In the third embodiment, both the waveguide forming region 10 and the substrate 1 are clipped to be depressed by the positional shift suppressing member 11 having the above-explained construction. As a consequence, while equal stress may be applied from the upper side of the waveguide forming region 10 to the two linear regions so as to depress these linear regions, equal stress may be applied from the lower side of the waveguide forming region 10 to the two linear regions so as to depress these linear regions according to the third embodiment.

In other words, according to the third embodiment, while the clip 19 and the depression base 31 (31a and 31b) are constituted as separate members, the two depression bases 31a and 31b are mutually located in parallel to each other. Then, while the equal stress is applied to the two linear regions from upper/lower sides of the arrayed waveguide grating (namely, both upper side of waveguide forming region 10 and the lower side of substrate 1) functioning as the planar lightwave circuit respectively, both the waveguide forming region 10 and the substrate 1 can be depressed. This structure can correct the positions of the separated slab waveguides on the same plane, as compared with such a case that the stress is applied to one linear region. As a result, this structure can make the optical axis of both the separated slab waveguides 3a and 3b coincident with the Z direction in a more correct manner.

As a consequence, the third embodiment can achieve a similar effect to that of the second embodiment. Furthermore, as compared with the second embodiment, this third embodiment can suppress the fluctuation of the optical characteristic, which is caused by the change in the depressing positions of the positional shift suppressing member 11.

Figure 10:
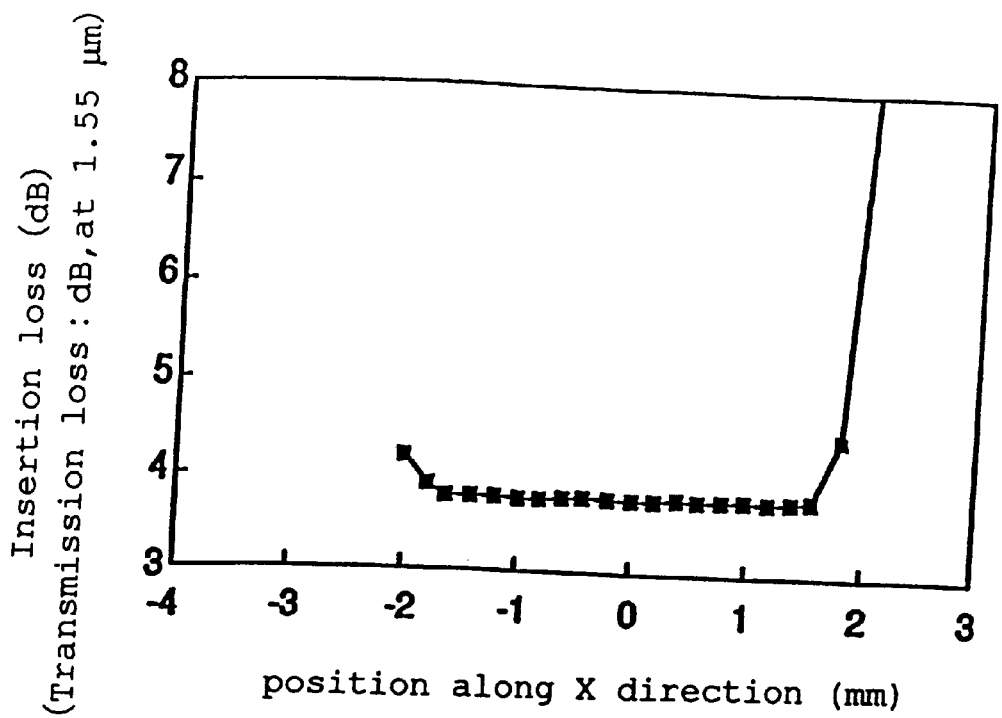
FIG. 10 is a graph for graphically showing a insertion loss characteristic of the third embodiment, when a depressing position by a curved surface forming portion is changed.

For example, FIG. 10 shows a relationship between the depressing position of the positional shift suppressing member 11 and the insertion loss. This drawing represents that a center position of the interval of the two linear regions corresponds to a position along the X direction. The interval of the two linear intervals is equal to 4 mm as indicated in the third embodiment.

In FIG. 10, in the case that the position of the X direction is selected to be −2.0 to −1.5 mm, or in the case that the position of the X direction is selected to be 1.5 to 2.0 mm, since any one of the two linear regions is located in the vicinity of the optical axis of the first slab waveguide 3, the insertion loss is increased.

However, in such a case that the position of the X direction is selected to be within a range between approximately −0.5 mm and +0.5 mm, both the two linear regions are located in the vicinity of both the side surfaces 14 of the separated slab waveguides 3a and 3b. In this case, the insertion loss is not increased.

Furthermore, until the center position of the interval of the two linear regions is separated from the optical axis of the first slab waveguide 3 by +1.5 mm and −1.5 mm, the insertion loss is stable, and thus, such a range where the insertion loss is stable is large.

As previously explained, the positional shift suppressing member 11 is formed by providing both the stress applying arm such as the clip 19 and the depression base 31 different from this stress applying arm. Then, when the waveguide forming region 10 is depressed via the interval by employing two or more linear regions, the stable range of the insertion loss in the case that the depressing position of the positional shift suppressing member 11 is changed can be widened.

In other words, this construction may realize such an arrayed waveguide grating type optical multiplexer/demultiplexer that even when the depressing position of the waveguide forming region 10 by the positional shift suppressing member 11 is slightly fluctuated, or slightly changed, the insertion loss is not essentially deteriorated.

Also, in accordance with the third embodiment, the positional shift suppressing member 11 is formed in such a manner that more than two sets of curved plane forming portions 30 whose diameters are larger than, or equal to 0.1 mm are mutually arranged via the interval. These curved plane forming portions 30 depress both the waveguide forming region 10 and the rear surface of the substrate 1 via the interval by employing the more than two linear regions. As a consequence, in accordance with this third embodiment, the stress applied to the waveguide forming region 10 can be furthermore controlled in a proper manner.

It should be noted that the curved plane forming portion 30 depresses at least the waveguide forming region 10 selected from these waveguide forming region 10 and the rear surface of the substrate 1 via the interval by using two or more linear regions. As a result, similar to the third embodiment, the stress applied to the waveguide forming region 10 can be controlled in a proper manner.

Also, even when the shape of the first slab waveguide 3 of the third embodiment is made similar to the shape of the first slab waveguide 3 according to the first embodiment, a similar effect may be achieved.

In other words, even in such a case that the both side surfaces 14 of the separated slab waveguides 3a and 3b are located substantially parallel to the optical axis of the separated slab waveguides 3a and 3b, since the construction of the positional shift suppressing member 11 is made similar to the structure of the positional shift suppressing member 11 employed in the third embodiment, the range where the insertion loss is stable can be widened as indicated in FIG. 10.

Figure 11:
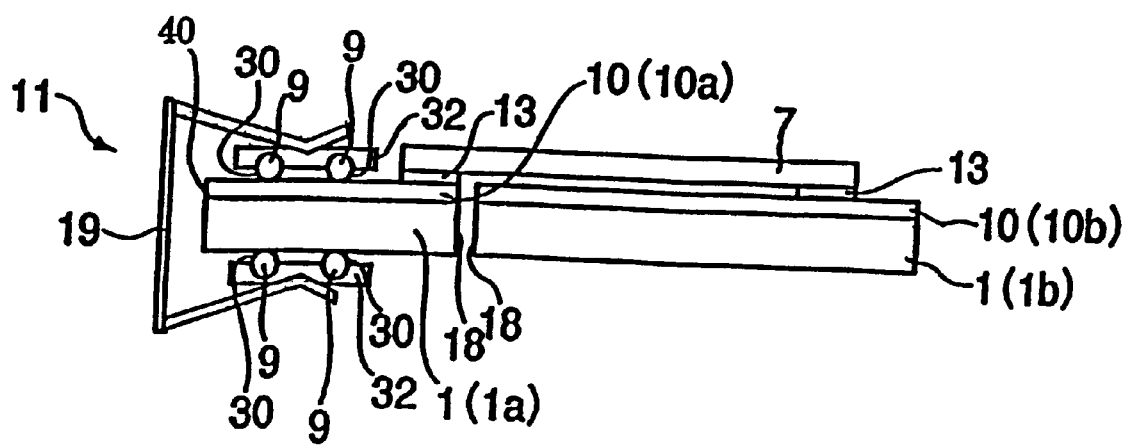
FIG. 11 is a structural diagram for indicating a major structure of an arrayed waveguide grating type optical multiplexer/demultiplexer according to a fourth embodiment of the present invention by way of a plan view.

FIG. 11 is a structural diagram for indicating a major structure of an arrayed waveguide grating type optical multiplexer/demultiplexer according to a fourth embodiment of the present invention by way of a front view. It should be noted that a structure of the fourth embodiment as viewed in a plan view is made similar to that of the third embodiment. Also, a construction of a positional shift suppressing member 11 according to the fourth embodiment is different from the construction of the positional shift suppressing member 11 according to the third embodiment. It should also be noted that structures of the fourth embodiment other than this structure are made similar to those of the second and third embodiments, and therefore, descriptions of the same structures as those of the fourth embodiment are omitted.

Figure 12A:
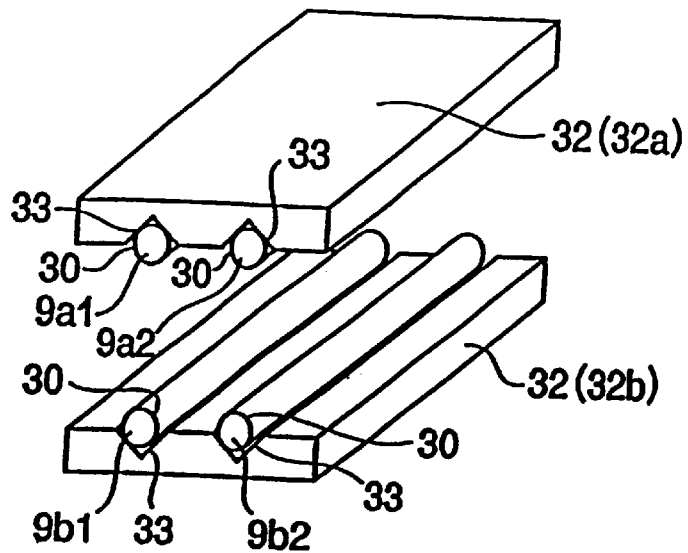
FIG. 12A is an explanatory diagram for explanating one structural example of both a cylinder and a cylinder holding base in the fourth embodiment.

In the fourth embodiment, the positional shift suppressing member 11 contains the clip 19, cylindrical members (cylinders) 9 (namely, 9a1, 9a2, 9b1, and 9b2) shown in FIG. 11 and FIG. 12A, and a cylinder holding base 32 (namely, 32a and 32b) for holding this cylinder 9. The clip 19 may function as a stress applying arm similar to that of the third embodiment. In this fourth embodiment, the clip 19, the cylinders 9, and the cylinder holding bases 32 are manufactured by employing individually separate members. The clip 19 depresses the planar lightwave circuit via both the cylinder 9 and the cylinder holding bases 32.

Also, as indicated in FIG. 12A, V-shaped groove portions 33 are formed in the cylinder holding base 32a via an interval, while the cylinders 9a1 and 9a2 are inserted into these groove portions 33. Similarly, V-shaped groove portions 33 are formed in the cylinder holding base 32b via an interval, while the cylinders 9b1 and 9b2 are inserted into these groove portions 33.

Figure 12B:
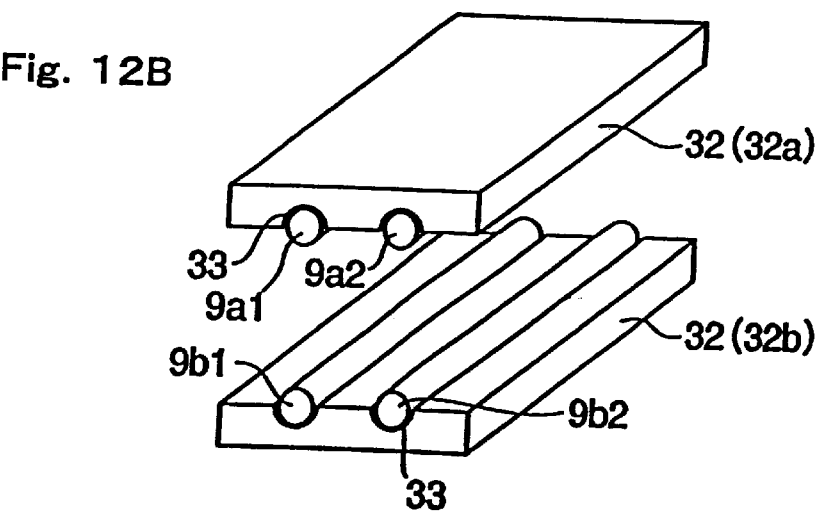
FIG. 12B is an explanatory diagram for explanating another structural example of both the cylinder and the cylinder holding base in the fourth embodiment.

It should be noted that as shown in FIG. 12B, the shapes of the groove portions 33 may be made in the form of, for example, U-shaped grooves located along an arc of the cylinder 9.

A diameter of any one of these cylinders 9 is larger than, or equal to 0.1 mm. The cylinders 9 are rotatably held on the cylinder holding bases 32 functioning as a cylinder holding members. In this fourth embodiment, while a curved plane forming portions 30 are formed by a side peripheral plane of the cylinders 9, this curved plane forming portion 30 is employed so as to depress the waveguide forming region 10 and the substrate 1 via an interval by way of two linear regions. An interval between these tow linear regions is equal to 4 mm.

In the fourth embodiment, both the waveguide forming region 10 and the substrate 1 are sandwiched and depressed by the positional shift suppressing member 11. In other words, similar to the third embodiment, according to the fourth embodiment, the clip 19, the cylinders 9, and the cylinder holding bases 32 are formed by employing the separate members individually. The waveguide forming region 10 and the substrate 1 are depressed via the interval by the two linear regions by employing the curved plane forming portions 30 of the side peripheral plane of the cylinders 9. As a result, the fourth embodiment can achieve an effect similar to that of the third embodiment.

Also, according to the fourth embodiment, since the curved plane forming portions 30 are formed by the side peripheral surface of the cylinders 9, this curved plane forming portions 30 can be readily formed by the cylinders 9. Furthermore, in the fourth embodiment, since the cylinders 9 are rotatably held by the cylinder holding bases 32, the following effect may be achieved. In other words, according to the fourth embodiment, even when the waveguide forming region 10a is moved by the slide moving member 7, friction produced between the waveguide forming region 10a and the positional shift suppressing member 11 can be reduced to a very small friction value. As a result, since the waveguide forming region 10a is moved by the slide moving member 7, the temperature depending characteristic of the light transmission center wavelength can be suppressed in a more correct manner according to the fourth embodiment.

Figure 13:
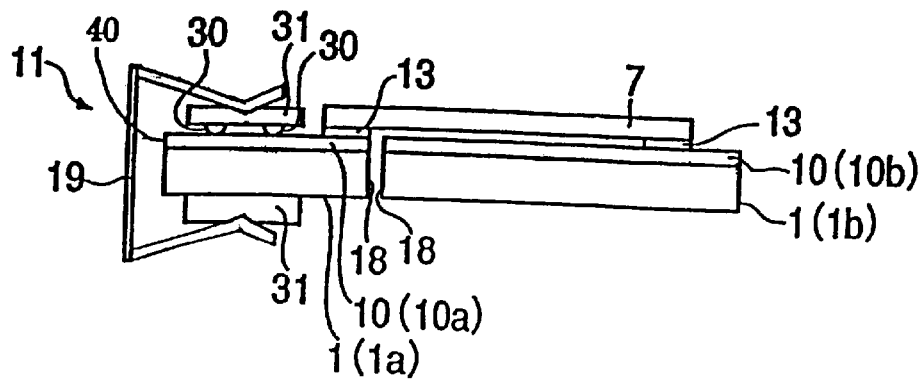
FIG. 13 is an explanatory diagram for indicating another embodiment of the arrayed waveguide grating type optical multiplexer/demultiplexer according to the present invention.
Figure 15:
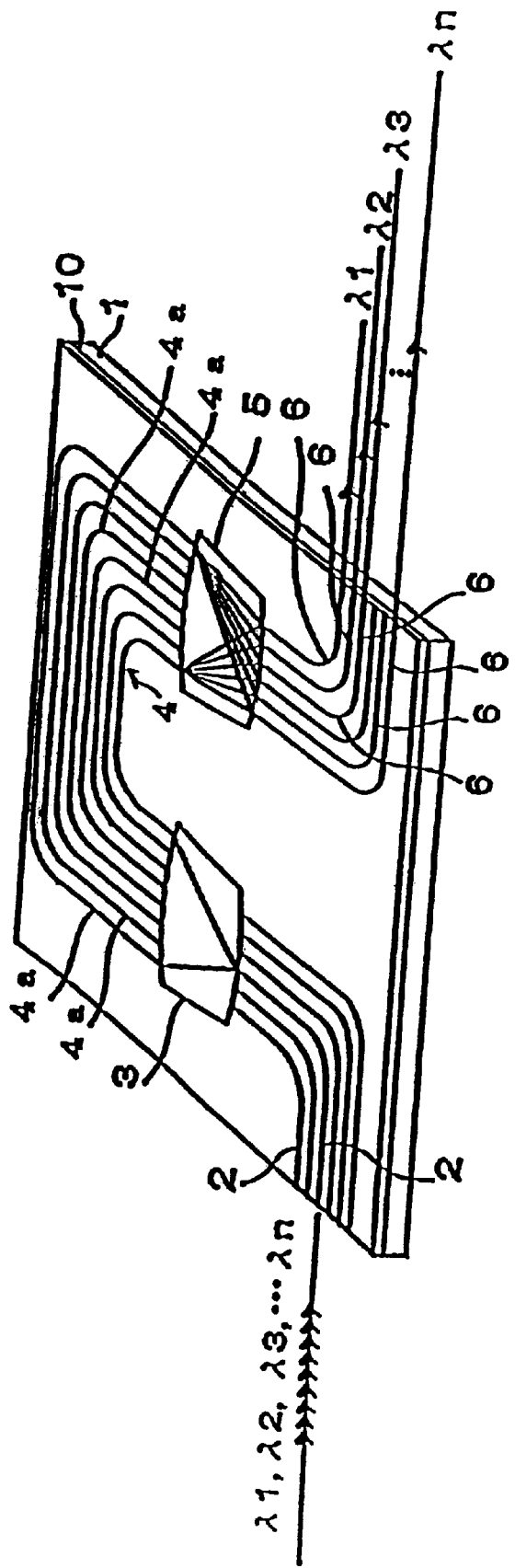
FIG. 15 is an explanatory diagram for explaining the conventional arrayed waveguide grating type optical multiplexer/demultiplexer.

It should also be understood that the present invention is not limited to the above-described various embodiments, but may employ various embodiment modes. For instance, in the third embodiment and the fourth embodiment, both the front surface side of the waveguide forming region 10 and the rear surface side of the substrate 1 are depressed by the two linear regions via the interval. Alternatively, as shown in FIG. 13, while the front surface side of the waveguide forming region 10 is depressed by two linear regions via the interval by employing the curved plane forming portions 30, the rear surface side of the substrate 1 may be depressed by using a depression bases 31 and the like under plane depression.

Also, in the case that both the front surface side of the waveguide forming region 10 and the rear surface side of the substrate 1 are depressed via the interval by a plurality of linear regions, a total number of these linear regions is not limited only to two, but three or more linear regions may be employed so as to depress both the front surface side of the waveguide forming region 10 and also the rear surface side of the substrate 1.

Furthermore, the regions for depressing both the front surface side of the waveguide forming region 10 and the rear surface side of the substrate 1 are not limited to such linear regions, but either planes or points may be used to depress these surfaces.

Further, in the respective embodiments, the positional shift suppressing member 11 has the clip 19. Alternatively, a stress applicable member other than the clip 19 may be employed so as to form such a positional shift suppressing member 11.

Furthermore, in the respective embodiments, the depressing position of the waveguide forming region 10 by the positional shift suppressing member 11 is set to such a position located in parallel to the optical axis of the separated slab waveguides 3a and 3b. Alternatively, the depressing position of the waveguide forming region 10 by the positional shift suppressing member 11 is not always set to such a position located in parallel to the optical axis of the separated slab waveguides 3a and 3b. In other words, according to the present invention, the depressing position of the waveguide forming region 10 by the positional shift suppressing member 11 may be formed at such a position which is escaped from the optical axis of the separated slab waveguides 3a and 3b.

Also, in the above-described third and fourth embodiments, the interval of the two linear regions is selected to be 4 mm. However, this interval is not specifically limited, but any interval values may be employed if the depressing position of the waveguide forming region 10 may become such a position separated from the optical axis of the separated slab waveguides longer than, or equal to 0.3 mm.

Furthermore, in the respective embodiments, the first slab waveguide 3 is separated. Alternatively, since the arrayed waveguide grating is formed by utilizing the reciprocity characteristic of the light, the second slab waveguide 5 may be separated at the separating plane. Alternatively, both the first slab waveguide 3 and the second slab waveguide 5 may be separated at the respective separating planes.

In any cases, while the structure of the slide moving member is properly set, at least one of the separated slab waveguide may be moved by the slide moving member along the cross separating plane in such a direction that the temperature depending variations of the respective light transmission center wavelengths are reduced. As explained the respective embodiments, in these constructions, since the depressing position of the waveguide forming region 10 by the positional shift suppressing member 11 is set to such a position which is escaped from the optical axis of the separated slab waveguides, a similar effect to that of the respective embodiments may be achieved.

In such a case that the second slab waveguide 5 is separated, when both the side surfaces of the separated slab waveguides are formed substantially parallel to the optical axis of the separated slab waveguides in such a manner that the second slab waveguide 5 is formed in the rectangular shape as explained in the first embodiment, or the second slab waveguide 5 is formed in the same shape as the first slab waveguide 3 shown in FIG. 14, the setting width of the position depressed by the positional shift suppressing member 11 may be widened.

Furthermore, the cross separating plane 8 of the first slab waveguide 3 or the second slab waveguide 5 is not limited to such a plane located substantially parallel to the X axis as explained in the respective embodiments. Alternatively, this cross separating plane 8 may be replaced by a plane inclined with respect to the X axis, as far as being separated by such a plane which is intersected to a path of light which passes through a slab waveguide to be separated.

Furthermore, the detailed values of the arrayed waveguide grating type optical multiplexer/demultiplexer according to the present invention, for instance, the equivalent indexes, the total quantities, and the dimensions of the respective waveguides 2, 3, 4, 5, 6 are not limited to specific values, but may be properly set.

What is claimed is:

1. An arrayed waveguide grating optical multiplexer/demultiplexer comprising:

a planar lightwave circuit in which a waveguide forming region is formed on a substrate; wherein:

said waveguide forming region is comprised of:
at least one optical input waveguide;
a first slab waveguide connected to an output side of said at least one optical input waveguide;
an arrayed waveguide connected to an output side of said first slab waveguide, and constituted by a plurality of channel waveguides which are arranged side by side and has different lengths of a set amount;
a second slab waveguide connected to an output side of said arrayed waveguide; and
a plurality of optical output waveguides connected to an output side of said second slab waveguide, and arranged side by side;
at least one of said first slab waveguide and said second slab waveguide is separated at a cross separating plane intersected to a path of light passing through the slab waveguide so as to form separated slab waveguides; and wherein:
said arrayed waveguide grating optical multiplexer/demultiplexer is further comprised of:
a slide moving member for moving at least one of said separated slab waveguides along said cross separating plane, depending upon a temperature of the arrayed waveguide; and
a positional shift suppressing member for suppressing an optical axis shift along a Z direction perpendicular to the planes of substrate of said separated waveguides by depressing said waveguide forming region; and wherein:
a position depressing the waveguide forming region by said positional shift suppressing member is formed at such a position escaped from the optical axis of said separated slab waveguides.

2. An arrayed waveguide grating optical multiplexer/demultiplexer according to claim 1 wherein:

both side surfaces of the separated slab waveguides are formed substantially parallel to the optical axis of said separated slab waveguides.

3. An arrayed waveguide grating optical multiplexer/demultiplexer according to claim 1 wherein:

the optical axis of the separated slab waveguides is formed substantially parallel to a side surface of the planar lightwave circuit, while being located in proximity to the side surface of said separated slab waveguides along the separated slab waveguides.

4. An arrayed waveguide grating optical multiplexer/demultiplexer according to claim 1 wherein:

the position depressing the waveguide forming region by said positional shift suppressing member is located at such a position separated from the optical axis of the separated slab waveguides longer than, or equal to 0.3 mm.

5. An arrayed waveguide grating optical multiplexer/demultiplexer according to claim 1 wherein:

said positional shift suppressing member is arranged in such a manner that the waveguide forming region is depressed from a front surface side of the separated slab waveguides.

6. An arrayed waveguide grating optical multiplexer/demultiplexer according to claim 1 wherein:

the position depressing the waveguide forming region by said positional shift suppressing member is set as two or more linear regions via an interval.

7. An arrayed waveguide grating optical multiplexer/demultiplexer according to claim 6 wherein:

the positional shift suppressing member is arranged in such a manner that two or more linear regions of a rear surface of the substrate are depressed from a rear surface side of the substrate in correspondence with the position depressing the waveguide forming region.

8. An arrayed waveguide grating optical multiplexer/demultiplexer according to claim 6 wherein:

the positional shift suppressing member is formed in such a manner that two or more sets of curved plane forming portions whose diameter is larger than, or equal to 0.1 mm are arranged via an interval; and said curved plane forming portions depress at least the front surface side of the waveguide forming region, selected from the waveguide forming region and the rear surface of the substrate via an interval by way of two or more linear regions.

9. An arrayed waveguide grating optical multiplexer/demultiplexer according to claim 6 wherein:

said positional shift suppressing member includes:
a stress applying arm for sandwiching the planar lightwave circuit from both the front surface side of the waveguide forming region and the rear surface side of the substrate; and
depression bases in which two or more curved plane forming portions whose diameter is larger than, or equal to 0.1 mm are arranged via a interval; and wherein:
said stress applying arm depresses said planar lightwave circuit via said depression bases.

10. An arrayed waveguide grating optical multiplexer/demultiplexer according to claim 8 wherein:

the curved plane forming portion is formed by a side peripheral plane of a cylinder.

11. An arrayed waveguide grating optical multiplexer/demultiplexer according to claim 10 wherein:

a cylinder is rotatably held by a cylinder holding member.

12. An arrayed waveguide grating optical multiplexer/demultiplexer according to claim 10 wherein:

said positional shift suppressing member includes:
a stress applying arm for sandwiching the planar lightwave circuit from both the front surface side of the waveguide forming region and the rear surface side of the substrate; and
cylinder holding bases for holding the cylinders; and wherein:
said planar lightwave circuit is depressed via both said cylinders and said cylinder holding bases by said stress applying arm.

* * * * *

UNITED STATES PATENT AND TRADEMARK OFFICE
CERTIFICATE OF CORRECTION

PATENT NO. : 6,668,117 B2 Page 1 of 1
APPLICATION NO. : 10/094795
DATED : December 23, 2003
INVENTOR(S) : Hasegawa et al.

It is certified that error appears in the above-identified patent and that said Letters Patent is hereby corrected as shown below:

On the title page, Item (75), the Inventors Information is incorrect. Item (75) should read:

-- (75) Inventors: Junichi Hasegawa, Tokyo (JP);
Atsushi Hiraizumi, Tokyo (JP);
Tsunetoshi Saito, Tokyo (JP);
Yoshinobu Nekado, Tokyo (JP) --

Signed and Sealed this

Twenty-second Day of January, 2008

JON W. DUDAS
*Director of the United States Patent and Trademark Office*